No. 767,735. PATENTED AUG. 16, 1904.
J. W. COVERT.
BUGGY BOOT.
APPLICATION FILED MAY 2, 1904.
NO MODEL.
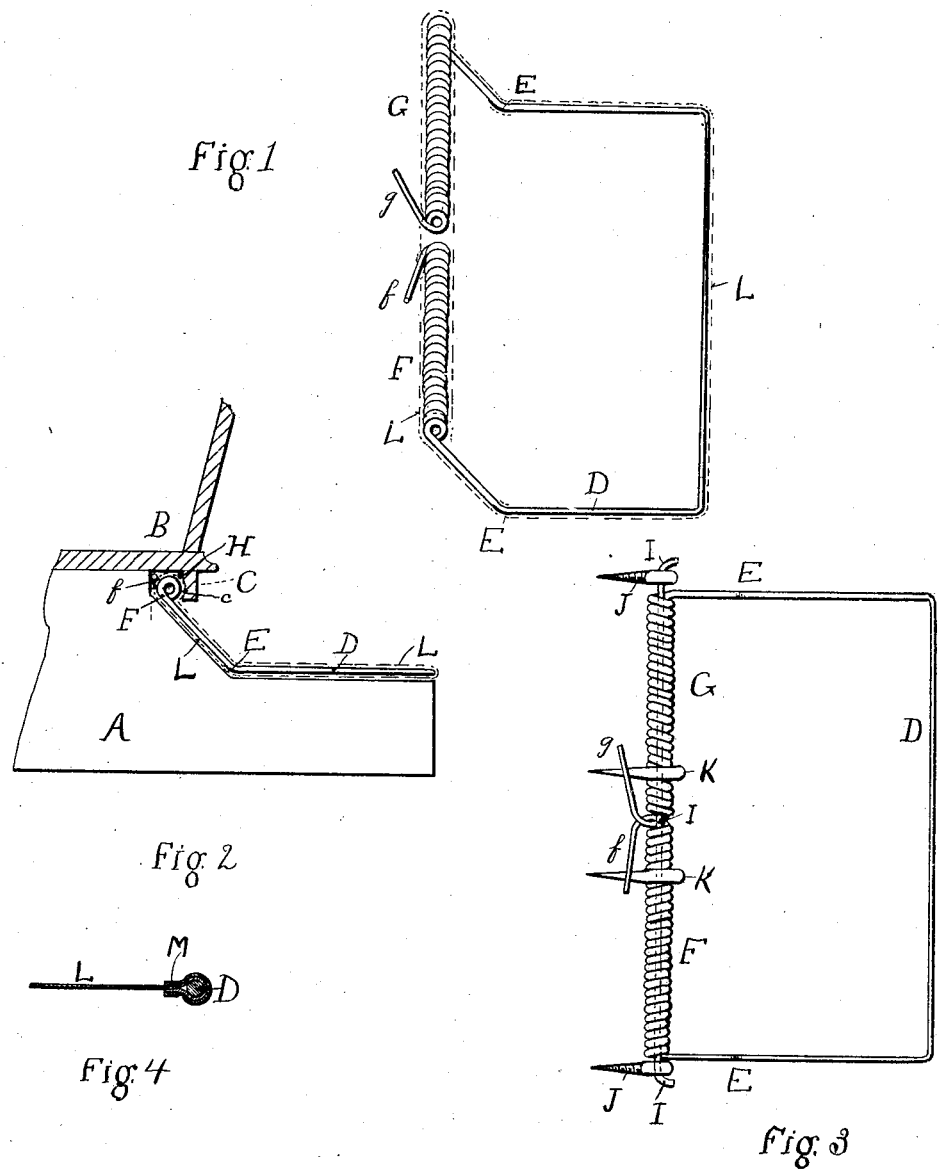

No. 767,735. Patented August 16, 1904.

UNITED STATES PATENT OFFICE.

JOHN W. COVERT, OF RARITAN, ILLINOIS.

BUGGY-BOOT.

SPECIFICATION forming part of Letters Patent No. 767,735, dated August 16, 1904.

Application filed May 2, 1904. Serial No. 205,919. (No model.)

*To all whom it may concern:*

Be it known that I, JOHN W. COVERT, a citizen of the United States of America, residing at Raritan, in the county of Henderson and State of Illinois, have invented a new and useful Improvement in Buggy-Boots, of which the following is a specification.

The invention has special relation to the frame for the boot-covering for buggies of the type known as the "piano-box." As heretofore constructed the covering has been attached to the under and rear side of the seat, and a spring, as a rubber, has been used to keep the covering in place and prevent rattling. Other devices also have been used for similar purposes.

It is the object of the present invention to provide a frame which is economical in construction, simple, and efficient not only as a frame, but also as a means for keeping the covering tightly in place and preventing rattling; and the invention consists in the arrangement of a spring-wire, as set forth herein and as shown in the accompanying drawings, forming part of this specification, and in which—

Figure 1 is a perspective view of the frame detached from the buggy, the covering being indicated by the dotted outline. Fig. 2 is a side elevation, the buggy-seat being shown in section. This view represents one means of attaching the frame to the buggy. Fig. 3 is a top or plan view of the frame with other means for securing it to the buggy. Fig. 4 shows how the covering may be attached to the frame, being a sectional view of same.

Like letters refer to like parts throughout the several views.

To construct my invention in its preferred form, I use a spring-wire. I bend it into a shape to correspond with the contour of the top of the rear of the buggy, as indicated by D in the drawings. The portion which fits under the seat, where the covering is ordinarily hinged or otherwise fastened to the buggy, is turned into a coil with the ends loose, as indicated by F G $f$ $g$. The covering L may be of any suitable material, as oil-cloth or leather, and may be secured to the wire by the metal strip M, which is pressed around the wire and covering.

A represents the rear portion of a buggy of the type known as the "piano-box." B is a portion of the seat, and C is a cleat pending from the rear of the seat, whereby an opening or slot or groove is formed into which the coils F and G are pressed, with the ends $f$ and G in the corner, as indicated in Fig. 2. If desired, the cleat C may be grooved, as at $c$, which will insure keeping the coils in place. In this form the spring-coils will serve to keep the frame down tightly against the buggy-box.

If desired to stiffen the spring, a rod I may be used, as shown in Fig. 3, and if not convenient to attach the spring and frame to the buggy, as shown in Fig. 2, then staples K K may be used, or the ends of the rod I may be held in the screw-eyes J J, the ends being bent over to keep the device in place, as shown in Fig. 3.

Of course I contemplate that any means may be used to fasten the frame to the buggy, so that a bearing is found for the ends $f$ $g$, so as to form a spring-hinge, and I also contemplate that the frame may be in any desired form to fit any sort of buggy and that there may be other variations from the exact description herein without departing from the spirit of the invention.

By the use of my invention it will be noted that the lid may be raised when desired and also that the spring-hinge will serve to hold the lid or boot down tightly against the box and keep it from rattling as well as to prevent the contents from being thrown out.

The wire may be of any suitable size. A very small-diameter wire will suffice, and it will not detract from the neatness of the vehicle. There are no rubbers to replace, and the device will last indefinitely. The two wire ends may be interlocked, as shown in Fig. 3, to prevent their spreading.

I do not claim, broadly, the use of a spring to keep the cover down on the body of the buggy; nor do I claim, broadly, the use of a coil-spring or torsion-spring for that purpose. I am aware that coil-springs have been used for that purpose which have been separate and apart from the frame—i. e., not integral with the frame—while my present invention consists in the spring which is an integral part of the frame, so that the spring and frame consist of one continuous spring-wire.

What I claim is—

1. A frame for buggy-boots comprising the spring-wire bent into suitable form, with an integral portion bent into a coil to form a spring-hinge for attaching same to the buggy, substantially as set forth.

2. A frame for buggy-boots comprising the spring-wire bent into suitable form to correspond with the rear portion of the buggy, the two ends of the wire being bent into coils with projecting ends, and adapted to be secured to the buggy to form a spring-hinge integral with the frame, substantially as set forth.

3. The combination of the suitable covering and the frame secured thereto and comprising the spring-wire bent into suitable form with the two ends bent into coils with projecting ends and adapted to be secured to the buggy to form a spring-hinge integral with the frame, substantially as set forth.

4. The combination with the suitable covering, of the frame secured thereto and comprising the spring-wire bent into suitable form, with the two ends of the wire bent into coils with projecting ends and adapted to be secured to the buggy to form a spring-hinge integral with the frame, and a rod extending through the coils to stiffen the same and means for securing the device to the buggy, substantially as set forth.

In testimony whereof I have hereunto affixed my signature in the presence of witnesses.

JOHN W. COVERT.

Witnesses:
 JOSEPH GROLL,
 C. J. ANDERSON.